US009036174B2

(12) United States Patent
Hanley et al.

(10) Patent No.: US 9,036,174 B2
(45) Date of Patent: May 19, 2015

(54) COVER SHEETS USED FOR DIAGNOSIS

(75) Inventors: John Hanley, Emerald Hills, CA (US); Robert R. Price, Palo Alto, CA (US); David Garcia, Stanford, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 694 days.

(21) Appl. No.: 13/276,545

(22) Filed: Oct. 19, 2011

(65) Prior Publication Data

US 2013/0100471 A1 Apr. 25, 2013

(51) Int. Cl.
*G06K 15/00* (2006.01)
*G03G 15/00* (2006.01)

(52) U.S. Cl.
CPC ............ *G03G 15/5079* (2013.01); *G03G 15/55* (2013.01)

(58) Field of Classification Search
USPC ........................................................ 270/58.05
See application file for complete search history.

(56) References Cited

U.S. PATENT DOCUMENTS

| | | | | |
|---|---|---|---|---|
| 5,913,090 | A * | 6/1999 | Sawada et al. | 399/8 |
| 7,072,881 | B1 * | 7/2006 | Wright et al. | 1/1 |
| 7,243,270 | B2 * | 7/2007 | Taniguchi et al. | 714/44 |
| 7,668,912 | B2 * | 2/2010 | Nelson et al. | 709/204 |
| 8,693,062 | B2 * | 4/2014 | Roantree et al. | 358/406 |
| 2002/0001475 | A1 * | 1/2002 | Kikuchi et al. | 399/8 |
| 2005/0240376 | A1 * | 10/2005 | Uwatoko et al. | 702/183 |
| 2008/0027949 | A1 * | 1/2008 | Kawada | 707/10 |
| 2010/0110468 | A1 * | 5/2010 | Nagarajan et al. | 358/1.14 |
| 2010/0245930 | A1 * | 9/2010 | Gross et al. | 358/406 |
| 2011/0075208 | A1 * | 3/2011 | Ueda | 358/1.15 |

* cited by examiner

*Primary Examiner* — Hilina K Demeter
(74) *Attorney, Agent, or Firm* — Fay Sharpe LLP

(57) ABSTRACT

A method and system collects diagnostic data for use in diagnosing existing and potential image quality issues related to a printer. Document cover sheets and/or electronic versions of the cover sheets are routinely collected, even when there has been no reported image quality issue, to preserve a historical record of the output of the printer over an extended time period. The historical record of the images on the routinely collected cover sheets and/or electronic versions of the cover sheets include data useful in diagnosing existing and potential image quality issues related to substantive pages of the documents processed by the printer.

19 Claims, 5 Drawing Sheets

COVER SHEETS USED FOR DIAGNOSIS

BACKGROUND

The present application is related to printing technologies including but not being limited to xerographic printers, and more particularly to the diagnosing of issues related to the image quality (IQ) of documents produced by the xerographic and/or other printing technologies.

Presently, one manner in which image quality issues are identified is through a subjective review of a document by the user who generated the document. For example, the user may believe image quality issues exist such as streaking, inappropriate lightness, inappropriate darkness, and color bleeding, among other issues. Once a user perceives such image quality issues they will commonly contact the company which services the printer, such as by phone, email, or other communication channel. During this contact the user will attempt to explain the image quality issue. However, often such an interaction does not result in sufficient information for the servicing company to determine exactly what is causing the image quality issue, the degree of the image quality issue, and/or the manner in which to most effectively address the issue. Therefore, the servicing company will need to send a technician to visit the user's facility, to perform diagnostic testing on the printer.

It is not uncommon that an additional visit by the technician will be required. For example, the first visit may simply result in the identification of the problem, then, it might be necessary to obtain a part in order to address the problem. Alternatively, the technician may find there are in fact no image quality issues related to the printer, but rather a user has misinterpreted the document to have an image quality problem, as it is known that to a certain degree image quality issues are subjective.

Another process by which image quality issues are identified is through an automatic triggering of an alarm or alert by the printer itself. These alarms or alerts may be local such as a visual notification on a display screen of the printer. These alarms or alerts may also be forwarded to the servicing company via a communication channel, such as a phone network, the internet, etc.

In any of the above scenarios, significant costs are involved including the dispatching of a technician to the user's site. Particularly, if one were to view the steps involved in addressing image quality issues as a continuum of costs (including both costs in time and money) the most effective solution is one achieved by the user themselves at the printer. Almost as desirable is to have the solution generated by an in-house "expert" within the user's organization who is already at the facility. Thereafter, more expensive in time and costs would be a solution found by a helpdesk responding to a query from someone within the organization implemented by a user at the facility. A yet more expensive solution is having a technician from the servicing company visit the facilities of the user. Even further additional costs are incurred when the technician must make multiple trips to the location, and even more costly, would be the need to bring in a specialist technician.

Therefore, it would be desirable to provide a system and/or method, which is at the lower end of the described continuum.

BRIEF DESCRIPTION

A method and system collects diagnostic data for use in diagnosing existing and potential image quality issues related to a printer. Document cover sheets and/or electronic versions of the cover sheets are routinely collected, even when there has been no reported image quality issue, to preserve a historical record of the output of the printer over an extended time period. The historical record of the images on the routinely collected cover sheets and/or electronic versions of the cover sheets include data useful in diagnosing existing and potential image quality issues related to substantive pages of the documents processed by the printer.

DETAILED DESCRIPTION

Figure 1:
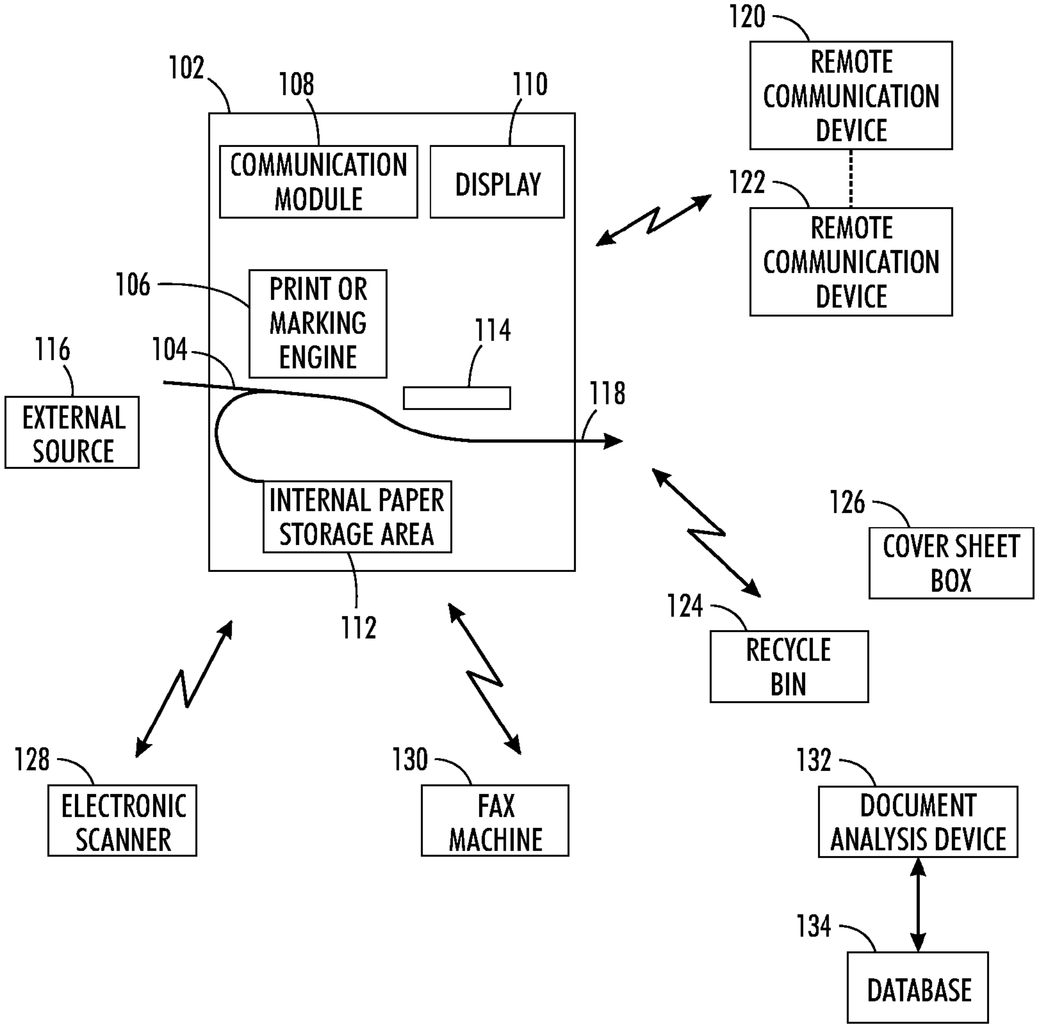
FIG. 1 is an illustration of an environment incorporating the concepts of the present application.

Turning to FIG. 1, illustrated is an embodiment of a system and method 100 incorporating the concepts of the present application. Particularly a printer 102 which among other components includes a paper path 104, print or marking engine 106, a communication module 108, a display 110 as well as an internal paper storage area 112. It is understood the printer 102 shown in FIG. 1 is a simplified version of many printing devices including xerographic printing devices which may presently be on the market or which will come onto the market in the future. Paper path 104 illustrates the path paper 114 travels. The paper received by printer 102 from either internal paper storage area 112 or fed into the printer from an external source 116, such as a paper feeder or simply a user placing the paper on the printer. As can be seen, as paper 114 moves through paper path 104 it interacts with print or marking engine 106, wherein a marking material (such as toner) is selectively applied to the surface of the paper 114 to form an image. The image may be text, figures, as well as a combination of these, and may be produced as black-and-white and/or color images. Printed pages of the document exit the printer 102 through an exit area 118. Operation of the printing process is controlled by appropriate software running on the printer.

Also shown in FIG. 1 are remote communication devices 120, 122, which in one embodiment may be some form of computing device, such as a desktop computer, laptop computer, and/or tablet computer, among others. These remote communication devices 120, 122 are operationally associated with the communication block 108 of printer 102 and are configured to send print jobs to the printer 102, as is commonly done in the art. Also shown in FIG. 1 is a recycle bin 124, and a cover sheet box (or banner box) 126. As will be expanded upon below, the arrangement of FIG. 1 is also shown to include an electronic scanner 128, a fax machine 130, as well as a document analysis device 132 and associated database 134. Various ones of these components are in operative connection or communication with each other via a LAN, internet, intranet or other communication system, in either a wired and/or wireless arrangement.

Figure 2:
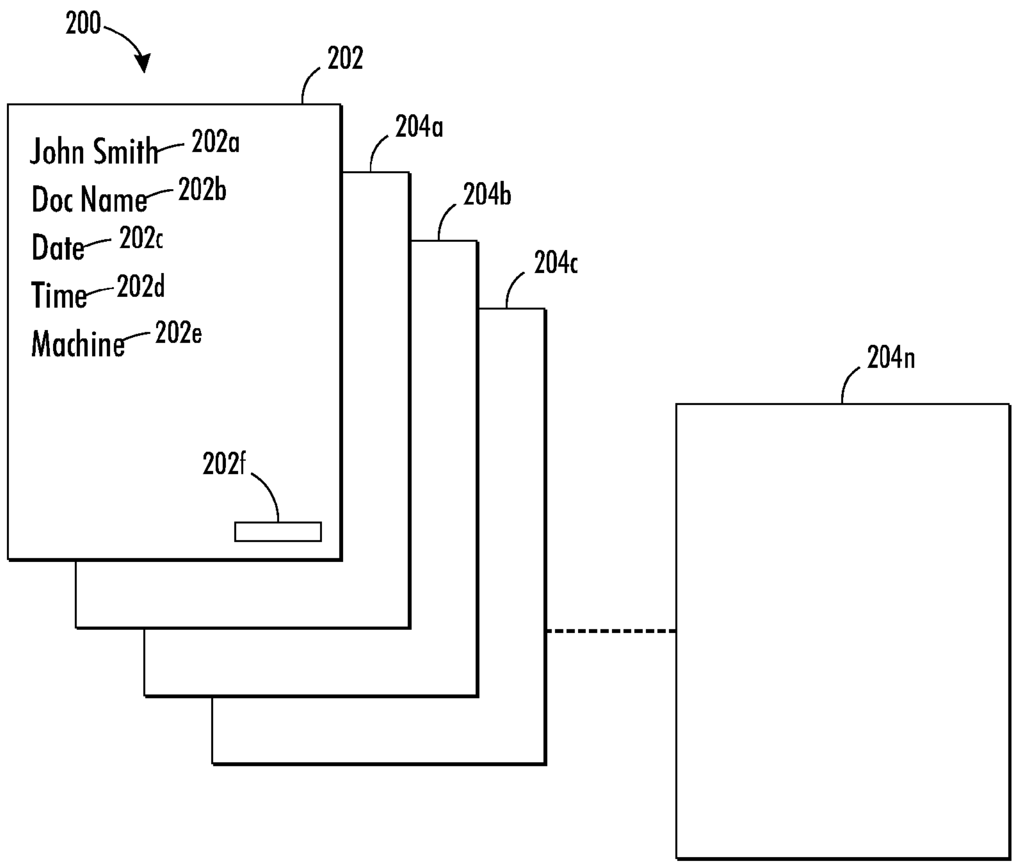
FIG. 2 is a multi-page document including a cover sheet according to the concepts of the present application.

Turning to FIG. 2, shown is an example of a multi-page document 200 generated by printer 102. Commonly, when a user generates a document (either while standing at printer 102, or remotely such as from remote communication devices

120, 122), the resulting document 200 will have a cover sheet (or banner or burst page) 202, in addition to content substantive pages 204*a*-204*n* which include the text and/or figures intended to be printed by the user. Instructions to print cover sheet 202 may be inserted into and/or be provided prior to and separate from a print job being sent to the printer 102 so the cover sheet 202 is printed prior to substantive pages 204*a*-204*n*. These instructions may come from remote communication devices 120, 122, and/or printer 102 itself.

Cover sheet 202 includes identification information such as, in one embodiment, the identity of the person who printed the document 202*a*, information related to the content of the document 202*b*, date 202*c* and time of printing 202*d*, as well as the device on which the document was printed 202*e*. Other information such as the name of the company that manufactured the device, test patterns, among other items of data may be programmed to be printed out on a cover sheet.

A particular aspect of cover sheets is that the categories of information that are printed are done so on a consistent basis in a consistent format irrespective of the content of the substantive pages 204*a*-204*n*. Particularly, while the specific information (e.g., the name of the person who printed the document, the title identifying the content, the actual date and time) will vary, the same categories of the identification information are presented in the same font, the same color, and in the same locations on the page irrespective of the content of the substantive pages 204*a*-204*n*. Therefore cover sheets present a consistently similar output over an extended period of time. Also, the data on cover sheets are understood to be and are treated as non-confidential information.

Cover sheets have in the past been used and seen as valuable only for distributing pages to the named recipient, and thereafter are simply discarded/recycled once having accomplished this task. The present application however uses these cover sheets to acquire image quality information. This information is used to address image quality issues both once an issue arises, as well as in predictive operations intended to avoid degradation of image quality. Thus the present concepts take a familiar output (the cover sheet) and employ it as a convenient user interface and data source.

More particularly, and as shown in FIG. 1, instead of simply discarding cover sheets 202 by throwing them away or placing them in recycle bin 124, cover sheets are preserved in cover sheet box 126. This allows cover sheets to be used to preserve a historical record of changes in output images on the cover sheets for particular printers. For example the layout of the cover sheet stays generally the same when printed in January or July which each may have very different environmental factors coming into play.

Then, when image quality issues arise or to take preventative actions, the images on the cover sheets are used to provide clues about image quality changes that may be occurring in the documents. A particular benefit of having the same image printed over an extended time period is that it, for example, allows for an easier understanding of the degradation of an image due to various factors such as the use of consumables, wear and tear of equipment, image misalignment, streaking, environmental factors, among other issues.

Therefore, in one sense, the present application institutes a system and process which provide for the routine collection of cover sheets even when there is no reported image quality problem. The cover sheets may be delivered to the servicing company by such means as being sent by regular mail or manually/personally delivered to a customer service center. In alternative embodiments the hardcopies of the cover sheets are electronically scanned by scanner 128 and sent by email or over a communication network, or faxed via fax machine 130. In still other embodiments the printer may have internal scanners which are programmed to automatically scan, recognize, and electronically save images of the cover sheets being printed, and which may then automatically deliver the electronic versions of the cover sheets to a customer service center.

In certain embodiments cover sheets 202 are provided with codes 202*f* which identify and distinguish the cover sheets from substantive sheets 204*a*-204*n*. The printers, via the use of the internal scanners, recognize the codes provided on the cover sheets. These codes may include but are not limited to data glyphs, various bar codes such as 2D codes, QR codes and other readable patterns. Providing codes 202*f* on the cover sheets allows printers to automatically distinguish cover sheets from substantive sheets of documents and to then electronically save images of the cover sheets. In this way electronic images of the substantive sheets are not inadvertently saved and sent to the customer servicing center.

Collection of cover sheets may also be achieved by a manual collection, which in its most general sense is a user placing a cover sheet in the cover sheet box after a cover sheet is printed. However it is understood this action of saving to the cover sheet box is dependent on the willingness of a user to take such an action and complete compliance is unlikely to be achieved. Also, in the manual collection scenario, as well as the automated collection scenario it may be desirable to not save and deliver every cover sheet (e.g., due to storage issues) but rather only some subset.

Therefore in this discussion it is to be understood that collection of each cover sheet printed by a printer is not needed for the collection of cover sheets to be considered routine. Rather a routine saving of the cover sheets may be considered achieved when a large enough sample of the cover sheets have been saved and delivered to provide a servicing company with sufficient historical data to assist in addressing present image quality issues and/or prediction of such issues. Thus, the number of cover sheets and/or electronic versions of the cover sheets actually delivered to a servicing company compared to the total number of cover sheets printed in a particular time period could selectively range from a small fraction of the total cover sheets printed to as high as 100% depending on the particular situation. For example, in a high output environment only a small percentage of total cover sheets and/or electronic versions of the cover sheets may need to be delivered to obtain sufficient historical data, whereas a low output environment would need to deliver a higher percentage of the total cover sheets to obtain sufficient historical data. Routine collection is not achieved however by a haphazard collection or by collection only after an image quality issue has been detected.

The practice of routine collection allows for the preserving of a historical record of data for specific printers, permitting an analysis which includes comparing pairs of artifacts (e.g. pairs of cover sheets) that were delivered to the servicing company.

Using the cover sheets also makes it possible to analyze an image or images on a particular cover sheet and/or electronic version thereof using printer data or diagnostic information which corresponds to the time the particular cover sheet was printed. It is understood that a plurality of particular cover sheets and/or electronic versions thereof may be analyzed in this manner. In certain embodiments the analysis is accomplished by image analyzer 132 configured to analyze the images for image quality problems, and then to update database 134 and/or take remedial action. In other embodiments the analysis may be accomplished by a human expert or specialist. While not being limited thereto, in some embodiments the database 134 is configured to store previous analysis data which is used by analyzer 132 in future analysis operations.

The use of cover sheets and electronic versions of the cover sheets thus moves the process for addressing and fixing image quality issues to the less costly portion of the previously mentioned continuum of costs.

Figure 3:
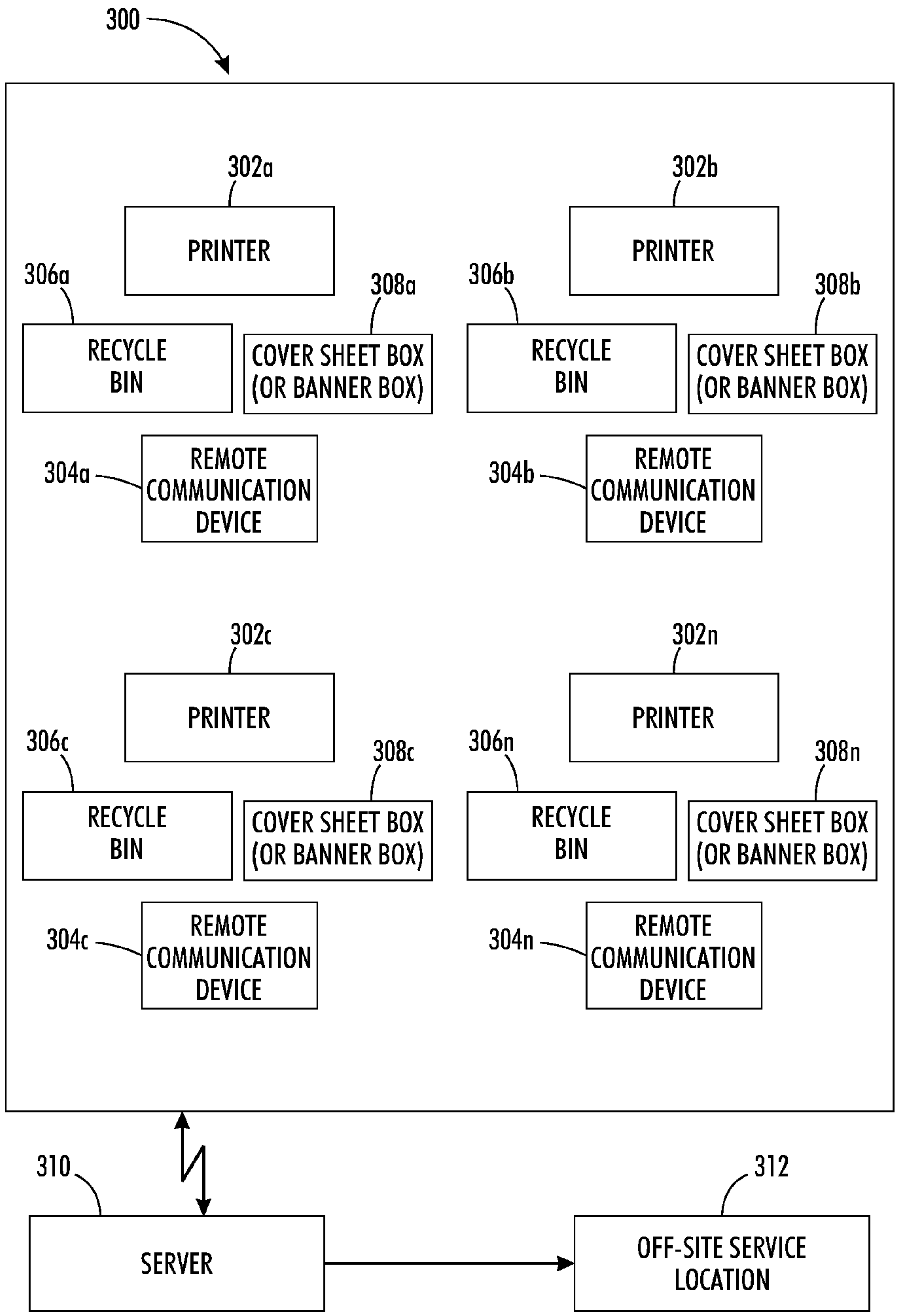
FIG. 3 depicts a network printing environment having multiple printers.

Turning to FIG. 3, illustrated is a document generating environment 300 which includes multiple printers 302*a*, 302*b*, 302*c*, 302*n*, each similar to printer 102 shown in FIG. 1. In addition, the environment 300 includes a plurality of remote communication devices 304*a*-304*n*, such as but not limited to laptop computers, desktop computers, tablet computers, as well as other electronic processing devices configured in a printer infrastructure which allows access and interaction with all or some of printers 302*a*-302*n*. Various ones of these components are for example in operative connection or communication with each other via a LAN, internet, intranet or other communication system, in either a wired and/or wireless arrangement.

Associated with the printers 302*a*-302*n* are recycle bins 306*a*-306*n*, and cover sheet boxes (or banner boxes) 308*a*-308*n*.

Document generating environment 300 may be found at the physical location of an organization such as a company, law firm, medical facility, educational facility, etc. which has multiple printers 302*a*-302*n* in a printer infrastructure. In many of these situations, the organization will contract out the task of operating and maintaining the printer infrastructure. In these types of arrangements a server 310 of the servicing company is operationally connected to the printer infrastructure which allows for communication with an off-site service location 312 staffed by the servicing company (e.g., a customer service center). The server in some configurations will be connected to the printer infrastructure though an organization's fire wall (not shown in the figure). The servicing company may maintain a help desk, as well as technicians and other back room operations at the off-site location 312. The organization (e.g., customer) would then agree to pay a fee to employ the servicing company. In one situation the organization and/or servicing company counts the number of page copies made by the printer infrastructure and the organization would then pay a set fee per copy.

Alternative arrangements between servicing companies and organizations may also be entered into, where for example there is something less than a total outsourcing of the maintenance of the printer infrastructure. For example, the organization may simply have a contract that when an image quality issue arises, the service company will be contacted to address the problem. In any of these arrangements, it is desirable for the service company to receive cover sheets being collected by the organization, such as in the cover sheet boxes 126, 308*a*-308*n*. One manner to encourage the organization to deliver these to the servicing company is by having the organization submit a certain number of cover sheets with the mailed remittance of the monthly charges paid to the service company. This submission of cover sheets may be accomplished as a requirement in the contract and/or as an incentive for a discount, or any other manner that might encourage participation. As an alternative to mailing, the organization may fax, email, or otherwise electronically provide the cover sheets to the servicing company in order to comply with contract requirements, or obtain incentive discounts. The cover sheets could also be provided in a toner-recycling envelope.

In situations such as FIG. 3, where there are multiple printers, the cover sheets would desirably identify the particular printer which printed the cover sheet.

In a further embodiment, it is known that certain printers have the capability of internally scanning and electronically storing images of pages which are being generated. In these environments all or a sub-set of cover sheets are scanned and electronically stored in the printer. In some embodiments the storage schedule may be to store one in every 100 cover pages, storing a certain number a day, week, and month or based on some other criteria. Then at a predetermined interval the electronically stored cover sheets are uploaded to the servicing company, and/or when a technician is at the organization those scanned and electronically stored cover sheets can be downloaded and used by the technician. This allows the technician to correlate readings obtained from the printer with images on the electronically stored cover sheets.

Figure 4:
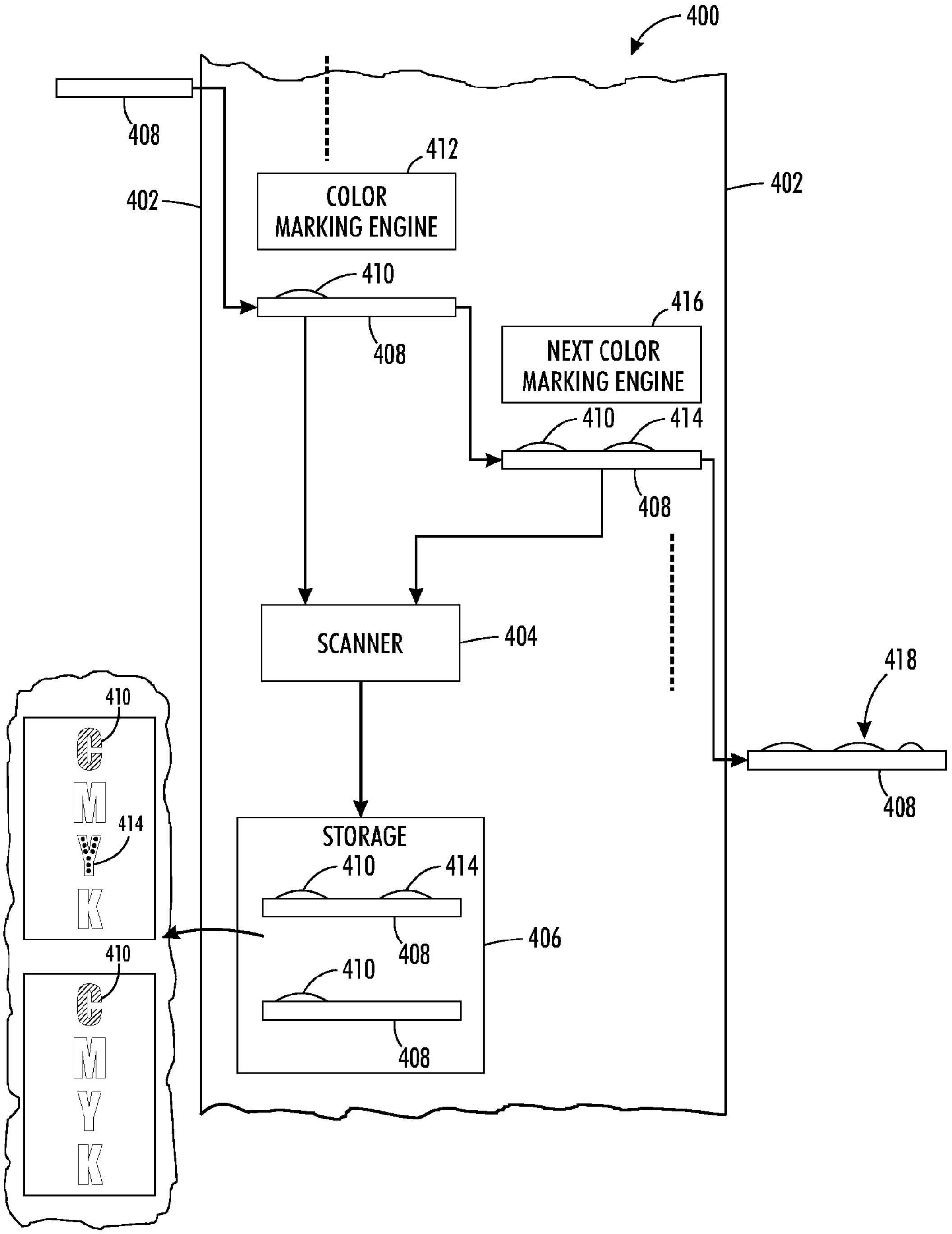
FIG. 4 depicts the flow of a document page through a printer in accordance with one embodiment of the present application.

Turning to FIG. 4, illustrated is a block diagram 400 showing an embodiment of the above concepts as applied to a printer 402 which includes scanner 404, and storage 406. This printer is configured to scan and electronically store aspects of a page as it is being generated to have color images. Therefore in the present embodiment the cover sheet has at least one color image found thereon.

In operation the printer 402 will undertake multiple operations to process and output a color cover sheet, including operations that apply various color layers. Therefore in this embodiment a page of paper 408 is provided to the device 402 and image generating operations are undertaken. The printer 402 is programmed to scan (via scanner 404) and store (in storage 406) partial versions of the cover sheet as it is being developed. Therefore, in this example after a color (e.g., cyan) 410 has been applied to the page by a color marking engine 412, the page image with the cyan color 410 is scanned and stored. Then, after a next color (e.g., yellow) 414 has been applied to the page by another color marking engine 416, this next partial version of the cover sheet (e.g., having cyan 410 and yellow 414) may be separately stored in storage 406. This process selectively continues for other predetermined additional operations until the final cover sheet image 418 is output.

In addition to the locations described in connection with the discussion associated with FIG. 4 it is understood images may be captured a different locations of the page development process. For example, images may also be captured around the fusing operations. Particularly, comparing images of a pre-fused and post-fused page provides useful information for the diagnosis of fuser problems. This technique would be equally useful in the diagnosis of both color pages and black and white pages.

These individually stored partial versions of the cover sheet provide data that may be useful in determining where image quality issues are arising, e.g., in a particular color application layer, prior to the color layers, pre-fusing operations, post-fusing operations or during some other production stage. By knowing this information the servicing company may more easily pinpoint the problem as being related to consumables, mechanical operations, etc. Additionally, while the above discussion focused on capturing multiple image versions, useful image quality data are also obtainable even by the capture of a single image, when that image capture takes place at a particularly information rich location in the process—e.g., such as but not limited to a single post-marking pre-fused page image.

Figure 5:
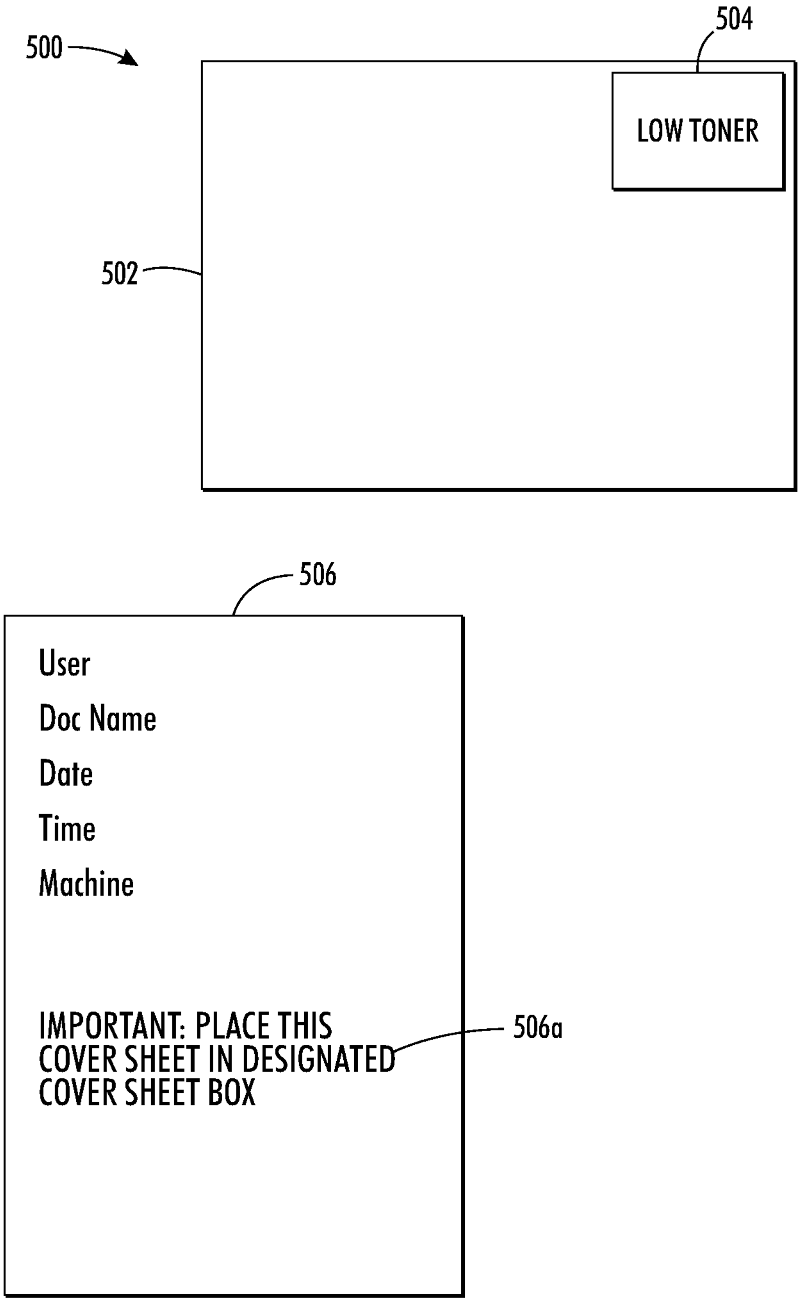
FIG. 5 depicts a printer and a cover sheet in accordance with another embodiment of the present application.

Turning to FIG. 5, shown is a block diagram 500 of another embodiment where printer 502 is programmed to automatically alter a cover sheet in response to certain predetermined occurrences. The altering of the cover sheet is achieved by use of known programming techniques available with existing printers. As one example, it is known that existing printers will issue an indicator (or alarm or alert) of a low toner situation 504. When this indicator is issued the printer 502 will cause a message to be printed on cover sheets (or a sub-set thereof) 506 which are printed thereafter. In one case the statement to the user might be: "IMPORTANT: PLACE THIS COVER SHEET IN THE DESIGNATED COVER SHEET BOX" 506*a*. This additional request/instruction is intended to increase the likelihood the user will comply with placing the cover sheet in the cover sheet box. Collecting the cover sheets at particularly relevant time periods increases the value of the information they provide. In addition, this information is also used proactively to avoid the issuance of maintenance and/or service calls.

It is understood that the low toner indicator described above is simply one example of data received from a printer that may be used in preventative maintenance. Other sensors may indicate a potential degradation of a component or potential image quality issue. Indicators from these sensors are combined with the systematic record keeping of the cover sheets described herein to anticipate when image quality problems will become noticeable to user. The cover sheets permit the viewing of actual image degradation, corresponding to the alarm or alert, as the component degrades. Having this information, allows a technician responding to an unrelated call to perform preventative maintenance at the same time on that printer. Therefore, having this information prior to responding to the unrelated issue, the technician would know to take an appropriate part thereby addressing two issues in one service call.

Further, tying this indicator information to additional information from the cover sheets which would identify whether a customer is a light user or heavy user allows the timing of the "preventative" repair. In other words, if it is known that a customer A is a light user then the time until the predicted image quality issue would arise could be anticipated to be much longer and therefore the preventative maintenance would not be needed as soon as for a customer B who would be a heavy user. In one situation a light user would be understood to generate documents requiring on average less toner per page than a heavy user. For example, a light user might be printing documents where the average coverage of a page by toner is approximately 30% or less (law firm) and average toner coverage for a heavy user is approximately 80% or more (greeting card company).

It is understood the cover sheets may also be designed to be interactive by adding questions with checkbox reply areas or other type of arrangement. So the concept would allow the user to easily state what the issue is and then the cover page could be quickly scanned or emailed to the servicing company.

The above example is simply one point in time when messages may be printed (e.g., "IMPORTANT: PLACE THE COVER SHEET IN THE DESIGNATED COVER SHEET BOX"). It is to be appreciated that the messages may be associated with different events and the messages themselves may vary depending on the event. For example, if the printer sensed a paper jam in a previous print job, the cover sheet may again automatically be altered to remind the user to save the cover sheet, and also a notation on the subsequently printed cover sheet may be made that the paper jam had recently occurred.

Turning to another embodiment of the present application, during normal operation printers work to maintain output within pre-determined parameters. For example, over time components of a printer may wear, break or otherwise not operate at their optimal level. Therefore, feedback loops are incorporated into printers to compensate for this wear and tear occurring to the printer. In one situation, for example, if voltage levels output from a certain component become lower over time the feedback loop may increase power to that component so that proper voltage levels are maintained. However, at some point these feedback loops are not able to maintain the desired parameters. It is often in these situations when image quality issues arise.

Therefore, in a preemptive application of the present concepts, when printing a cover sheet the printer is instructed to alter certain process parameters which in turn removes feedback loop generated compensation. This action is taken to obtain a non-compensated cover sheet (i.e., accepting the results due to the wear and tear on the printer). Such a cover sheet is then compared to the historical cover sheets which have been acquired over time (e.g., under normal feedback compensation being applied). This comparison assists the servicing company in predicting when a component will begin affecting image quality. By application of such preemptive action the service company can then take steps to avoid image quality service calls. For example, if a technician is already on a service call, they may be able to replace a part or otherwise troubleshoot the printer, rather than waiting for a complaint to be made in the future. Thus, altering process parameters of the printer, which may sacrifice cover sheet image quality, yields new diagnostic information.

Another area in which systematic collection of cover sheets provides useful information is in determining the cost of maintaining particular printers. For instance, printers manufactured by certain companies may be more expensive to service than printers manufactured by other companies. The information obtained by this systematic collection of cover sheets is used to provide a fuller picture of this issue. In such a situation the cover sheets can be more proactively monitored, so that if the sheets show an unusually high deterioration, this information can be used when pricing a next job with a similar set of circumstances.

As explained in the foregoing, arranging for a stream of cover sheets (or images of cover sheets) to arrive at a help desk, and to then be merged with an arriving stream of alerts:

1. offers more direct information about image quality at participating customer sites, and 2. by sampling a multi-vendor environment could reveal which products send informative alerts.

As has been shown by the foregoing, diagnostic test images may be more conveniently obtained if they are printed routinely rather than waiting for a user to be motivated to run a special diagnostic application. The cover sheet has several virtues including but not being limited to: each cover sheet looks similar to the next one, the cover sheet is printed during the same run as a substantive sheet that may elicit an image quality complaint, cover sheets are understood to contain non-confidential material, and the image quality of the cover sheets may be degraded at least on part of the cover sheet by altering voltages and other process parameters to obtain useful data, while not affecting the pages of a document containing substantive information.

It will be appreciated that variants of the above-disclosed concepts, features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of collecting diagnostic data for a printer, the method comprising:

generating at least one of cover sheets and/or electronic versions of the cover sheets, the cover sheets and/or electronic versions of the cover sheets identifying documents having substantive sheets being printed by the printer;

programming the printer to (i) automatically alter at least some cover sheets and/or electronic versions of the cover sheets in response to issuance by the printer of certain pre-determined occurrences, including the issuing by the printer of an alarm or alert, the altering at least some of the cover sheets and/or electronic versions of the cover sheets including adding a message on at least some of the cover sheets and/or electronic versions of the cover sheets corresponding to the issued alarm or alert and (ii) alter certain process parameters which in turn removes feedback loop generated compensation, wherein removal of the feedback loop generated compensation results in a non-compensated cover sheet which is printed, and the non-compensated cover sheet is compared with a compensated cover sheet printed with the feedback loop compensation being active, to predict when a component of the printer will begin affecting image quality, routinely collecting the generated cover sheets and/or electronic versions of the cover sheets; and preserving at least some of the collected cover sheets and/or electronic versions of the cover sheets as a historical record of the output of the printer over a time period, wherein the historical record of the cover sheets and/or electronic versions of the cover sheets includes data which is used to diagnose image quality issues and potential image quality issues related to the documents processed by the printer.

2. The method of claim 1, wherein routine collection of the electronic versions of the cover sheets include automatically scanning and storing images of the cover sheets internally within the printer, according to a predetermined electronically stored schedule.

3. The method of claim 1, further including analyzing the cover sheets and/or electronic versions of the cover sheets for image quality problems, in order to update a database and/or take remedial action.

4. The method of claim 1, wherein the cover sheets are selectively automatically sent to a customer service center for review by a specialist.

5. The method of claim 1, wherein the cover sheets are manually submitted by a customer to a customer service center.

6. The method of claim 1, wherein the electronic versions of the cover sheets are generated by manually electronically scanning images of the cover sheets by a customer, and wherein the manually electronically scanned images are electronically submitted by the customer to a customer service center.

7. The method of claim 1, wherein the cover sheets and/or electronic versions of the cover sheets are known to contain non-confidential data.

8. The method of claim 1, wherein the cover sheets and/or electronic versions of the cover sheets are collected routinely, wherein routinely includes collection even when no image quality issues have been identified.

9. The method of claim 1, further comprising performing an analysis of a particular cover sheet and/or electronic version of the particular cover sheet using data retrieved from the printer generated at a time corresponding to the time the particular cover sheet was printed and/or the electronic version of the particular cover sheet was electronically saved, the analysis being accomplished by use of an image analyzer configured to analyze the particular cover sheet and/or electronic version of the particular cover sheet for image quality problems.

10. A method of collecting diagnostic data for a printer, the method comprising:

generating paper cover sheets, the paper cover sheets identifying documents having substantive sheets being printed by the printer;

programming the printer to (i) automatically alter at least some of the paper cover sheets in response to issuance by the printer of certain pre-determined occurrences, including the issuing by the printer of an alarm or alert, the altering of at least some of the paper cover sheets including adding a message on at least some of the cover sheets corresponding to the issued alarm or alert, and (ii) instructing the printer to alter certain process parameters which in turn removes feedback loop generated compensation, wherein the removal of the feedback loop generated compensation results in a non-compensated cover sheet which is printed, and the non-compensated paper cover sheet is compared with a compensated paper cover sheet printed with the feedback compensation being active, to predict when a component of the printer will begin affecting image quality, routinely collecting the generated paper cover sheets; and preserving at least some of the collected paper cover sheets as a historical record of the output of the printer over a time period, wherein the historical record of the paper cover sheets includes data which is used to diagnose image quality issues and potential image quality issues related to the documents processed by the printer.

11. The method of claim 10, wherein process parameters of the printer are altered and at least one paper cover sheet is printed to yield diagnostic information while sacrificing image quality of the at least one paper cover sheet.

12. A diagnostic data collecting system for collecting diagnostic data for a printer, the system comprising:

a printer including a paper path, marking engine and software configured to generate cover sheets and substantive sheets, and configured to (i) automatically alter at least some cover sheets in response to issuance by the printer of certain pre-determined occurrences, including the issuing by the printer of an alarm or alert, the altering of the at least some of the cover sheets including adding a message on at least some of the cover sheets corresponding to the issued alarm or alert, and (ii) instruct the printer to alter certain process parameters which in turn removes feedback loop generated compensation, wherein the removal of the feedback loop generated compensation results in a non-compensated cover sheet which is printed, and the non-compensated paper cover sheet is compared with a compensated paper cover sheet printed with the feedback compensation being active, to predict when a component of the printer will begin affecting image quality; and a cover sheet record keeping system for routinely collecting and preserving data found on the cover sheets, the data to be used for diagnosing image quality issues and potential image quality issues related to documents processed by the printer.

13. The system of claim 12, wherein the cover sheet record keeping system includes a scanner arrangement configured to scan the cover sheets and to generate and store the electronic versions of the cover sheets according to an electronically stored schedule.

14. The system of claim 13, wherein the scanner arrangement is incorporated into the printer.

15. The system of claim 13, wherein the scanner arrangement is separate from the printer.

16. The system of claim 12, further including an image analyzer configured to analyze the cover sheets and/or the electronic versions of the cover sheets for image quality problems, and then to update a database and/or take remedial action.

17. The system of claim 12, wherein process parameters of the printer are altered to yield diagnostic information while sacrificing image quality of the cover sheets and/or electronic versions of the cover sheets.

18. The system of claim 12, wherein the cover sheets and/or the electronic versions of the cover sheets are collected routinely, wherein routinely includes collection even when no image quality issues have been identified.

19. The system of claim 12, further comprising an image analyzer configured to analyze a particular cover sheet and/or electronic version of the particular cover sheet, using data retrieved from the printer that was generated at a time corresponding to the time the particular cover sheet and/or electronic version of the particular cover sheet was generated.

* * * * *